(12) United States Patent
Oschlies et al.

(10) Patent No.: US 10,942,075 B2
(45) Date of Patent: Mar. 9, 2021

(54) METHOD AND APPARATUS FOR DETERMINING A DRIVER'S HAND TORQUE ON A STEERING WHEEL OF A VEHICLE

(71) Applicant: VOLKSWAGEN AG, Wolfsburg (DE)

(72) Inventors: Hendrik Oschlies, Braunschweig (DE); Falko Saust, Lehre (DE); Michael Rohlfs, Rötgesbüttel (DE)

(73) Assignee: Volkswagen AG

( * ) Notice: Subject to any disclaimer, the term of this patent is extended or adjusted under 35 U.S.C. 154(b) by 567 days.

(21) Appl. No.: 15/611,396

(22) Filed: Jun. 1, 2017

(65) Prior Publication Data

US 2017/0350777 A1    Dec. 7, 2017

(30) Foreign Application Priority Data

Jun. 3, 2016  (DE) .................... 10 2016 209 833.0

(51) Int. Cl.
| | |
|---|---|
| *G01L 5/22* | (2006.01) |
| *B62D 6/10* | (2006.01) |
| *G01L 3/16* | (2006.01) |
| *G01L 3/00* | (2006.01) |

(52) U.S. Cl.
CPC ............... *G01L 5/221* (2013.01); *B62D 6/10* (2013.01); *G01L 3/00* (2013.01); *G01L 3/16* (2013.01)

(58) Field of Classification Search
None
See application file for complete search history.

(56) References Cited

U.S. PATENT DOCUMENTS

| | | | |
|---|---|---|---|
| 5,557,520 A | | 9/1996 | Suissa et al. |
| 5,996,724 A | * | 12/1999 | Shimizu .................. B62D 6/00 180/446 |

(Continued)

FOREIGN PATENT DOCUMENTS

| | | | |
|---|---|---|---|
| CN | 101691124 B | * | 6/2012 |
| CN | 104029683 A | | 9/2014 |

(Continued)

OTHER PUBLICATIONS

DE 102009028647 A1 translation (Year: 2009).*

(Continued)

*Primary Examiner* — Lina M Cordero
(74) *Attorney, Agent, or Firm* — Barnes & Thornburg LLP

(57) ABSTRACT

A method for determining a driver's manual torque at a steering wheel of a vehicle which includes sensing a steering angle speed by a steering angle sensor, sensing a steering torque by a steering torque sensor at a steering column connected to the steering wheel, estimating a driver's manual torque applied by a driver at the steering wheel based on the sensed steering angle speed and the sensed steering torque by a Kalman filter by a controller, wherein during the estimation of the driver's manual torque a frictional torque is considered, and the frictional torque is estimated based on the steering torque which is sensed by the steering torque sensor, wherein the estimated frictional torque is taken into account as an interference factor during the estimation of the driver's manual torque in the Kalman filter. Also disclosed is an associated device.

12 Claims, 3 Drawing Sheets

(56) References Cited

U.S. PATENT DOCUMENTS

| | | | |
|---|---|---|---|
| 6,876,910 B2* | 4/2005 | Kifuku | B62D 5/0466 180/443 |
| 10,457,323 B2* | 10/2019 | Rohrmoser | B62D 6/008 |
| 2005/0257987 A1 | 11/2005 | Bohm et al. | |
| 2012/0210791 A1* | 8/2012 | Pannek | G01L 3/10 73/514.02 |
| 2013/0073084 A1* | 3/2013 | Ooga | B25J 9/1633 700/254 |
| 2014/0257628 A1 | 9/2014 | Lee et al. | |
| 2014/0371989 A1* | 12/2014 | Trimboli | B62D 6/10 701/41 |
| 2016/0001810 A1* | 1/2016 | Tsubaki | B62D 5/0472 701/42 |
| 2018/0032052 A1* | 2/2018 | Ishii | B23Q 3/157 |
| 2019/0217886 A1* | 7/2019 | Rohrmoser | B62D 5/006 |

FOREIGN PATENT DOCUMENTS

| | | |
|---|---|---|
| DE | 102007039332 A1 | 2/2008 |
| DE | 102009009032 A1 | 8/2010 |
| DE | 102009028647 A1 | 2/2011 |
| DE | 102010014802 A1 | 10/2011 |
| DE | 102013112901 A1 | 5/2015 |

OTHER PUBLICATIONS

CN-101691124-B translation (Year: 2012).*
Office Action for German Patent Application No. 10 2016 209 833.0; dated Nov. 29, 2018.
Search Report for German Patent Application No. 10 2016 209 833.0; dated Jan. 9, 2017.

* cited by examiner

METHOD AND APPARATUS FOR DETERMINING A DRIVER'S HAND TORQUE ON A STEERING WHEEL OF A VEHICLE

PRIORITY CLAIM

This patent application claims priority to German Patent Application No. 10 2016 209 833.0, filed 3 Jun. 2016, the disclosure of which is incorporated herein by reference in its entirety.

SUMMARY

Illustrative embodiments relate to a method and a device for determining a driver's manual torque at a steering wheel of a vehicle.

BRIEF DESCRIPTION OF THE DRAWINGS

The disclosed embodiments will be explained in more detail below with reference to the figures, in which.

DETAILED DESCRIPTION

Figure 1:
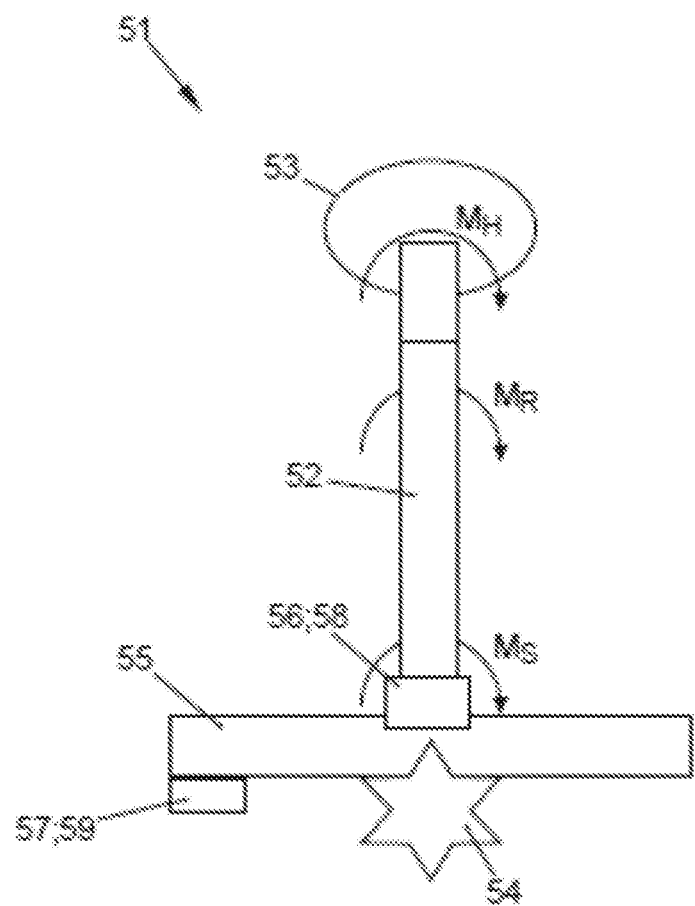
FIG. 1 shows a schematic illustration of a steering system with the torques which occur.

Modern vehicles, in particular motor vehicles, have a multiplicity of assistance systems which assist a driver in driving the vehicle. For example, braking assistants, lane keeping assistants and adaptive cruise control assistants are used.

In the case of lane keeping assistants, it is necessary to ensure that the driver can assume the driver's tasks completely again at any time. Conclusions about a driver's activity can be obtained by means of various concepts. For example, the driver's activity can be evaluated on the basis of a steering torque. However, the steering torque in this context is not sensed directly at the steering wheel but rather at the lower end of a steering column which is connected to the steering wheel. Steering columns are, like all mechanical systems, subject to friction. In addition, as a result of their mechanical kinematics they have an irregularity in their movement. These interactions make it more difficult to detect the driver's activity, in particular to detect hands-free travel. In addition, such influences are implemented in different ways owing to fabrication-related fluctuations. These fluctuations make an assessment of the driver's activity more difficult.

DE 10 2009 028 647 A discloses a method for detecting an operator control state of a steering wheel in a vehicle. For this purpose it is described that a current high-resolution steering wheel angle and a current steering torque are determined. A driver's manual torque which is currently being applied by the driver is determined as a function of the steering wheel angle and the steering torque. The operator control state of the steering wheel is then determined as a function of a profile of the driver's manual torque and it is detected whether the driver has his hands on the steering wheel ("hands on") or whether the driver has taken his hands off the steering wheel ("hands off").

Disclosed embodiments provide a method and a device for determining a driver's manual torque at a steering wheel of a vehicle, in which the determination of the driver's manual torque is improved.

A method for determining a driver's manual torque at a steering wheel of a vehicle is made available comprising the following operations: sensing a steering angle speed by means of a steering angle sensor, sensing a steering torque by means of a steering torque sensor at a steering column which is connected to the steering wheel, estimating a driver's manual torque, applied by a driver, at the steering wheel on the basis of the sensed steering angle speed and the sensed steering torque by means of a Kalman filter by means of a controller, wherein during the estimation of the driver's manual torque a frictional torque is taken into account, and the frictional torque is estimated on the basis of the steering torque which is sensed by means of the steering torque sensor, wherein the estimated frictional torque is taken into account as an interference factor during the estimation of the driver's manual torque in the Kalman filter.

In addition, a device is made available for determining a driver's manual torque at a steering wheel of a vehicle, comprising a steering angle sensor for sensing a steering angle speed, a steering torque sensor for sensing a steering torque at a steering column which is connected to the steering wheel, and a controller, wherein the controller is designed to estimate a driver's manual torque, applied by a driver, at the steering wheel on the basis of the sensed steering angle speed and the steering torque, sensed by means of the steering torque sensor, by means of a Kalman filter, wherein the controller is also designed to take into account, during the estimation of the driver's manual torque, a frictional torque and to estimate the frictional torque on the basis of the steering torque which is sensed by means of the steering torque sensor, wherein the controller takes into account the estimated frictional torque as an interference factor during the estimation of the driver's manual torque in the Kalman filter.

Disclosed embodiments provide that the driver's manual torque can be estimated more precisely and reliably than is the case, for example, with other methods which derive a driver's manual torque merely from a steering angle speed or a steering angle speed and a steering torque without taking into account a frictional torque. It has also become apparent that the method is also improved compared to methods which derive the frictional torque approximately from the steering angle speed, by virtue of a higher level of accuracy and reliability. In addition, a more reliable estimation of the driver's manual torque can be ensured.

A Kalman filter supplies an estimate for a current system state on the basis of an errored measurement and on a previous estimate of a system state. In this context, the current system state is stored in a state vector xk, where k stands for the number of the time operation. A dynamic matrix A is required to estimate the system states. The dynamic matrix A permits the previous system state to be mapped onto the next system state. External interference influences can also be included in the estimation by means of a transformation matrix B and the variable uk−1.

As described above, the estimation of the driver's manual torque in the controller is carried out by means of such a Kalman filter. For this purpose, a physical model of the steering system and a steering rack is produced, wherein the model takes into account a steering torque MS, a driver's manual torque MH and a frictional torque MR. The steering torque MS is sensed by means of a steering torque sensor. The model can be described by means of a differential equation:

$$\ddot{\varphi} = \frac{1}{j} * (M_R + M_H - M_S)$$

where j is an inertia of the steering system and $\dot{\varphi}$ is a steering angle acceleration. The steering torque $M_S$ is then obtained as follows:

$$M_S = M_R + M_H$$

To apply the Kalman filter the differential equation is converted into the state space representation with the two states steering angle acceleration $\dot{\varphi}s$ (the index s denotes here that the steering angle or a steering angle acceleration derived therefrom has been sensed on the steering angle sensor) and a change of the steering manual torque MH:

$$\begin{bmatrix} \ddot{\varphi}_S \\ \dot{M}_H \end{bmatrix} = \begin{bmatrix} 0 & 1/j \\ 0 & 0 \end{bmatrix} * \begin{bmatrix} \dot{\varphi}_S \\ M_H \end{bmatrix} + \begin{bmatrix} 1/j \\ 0 \end{bmatrix} * M_R$$

and $$\begin{bmatrix} \dot{\varphi}_S \\ M_S \end{bmatrix} = \begin{bmatrix} 1 & 0 \\ 0 & 1 \end{bmatrix} * \begin{bmatrix} \dot{\varphi}_S \\ M_H \end{bmatrix} + \begin{bmatrix} 0 \\ 1 \end{bmatrix} * M_R$$

The Kalman filter therefore has the state variables steering angle speed $\dot{\varphi}s$ and driver's manual torque MH:

$$x_k = \begin{bmatrix} \dot{\varphi}_S \\ M_H \end{bmatrix}$$

The system behavior is mapped by means of the dynamic matrix A:

$$A = \begin{bmatrix} 0 & 1/j \\ 0 & 0 \end{bmatrix}$$

The frictional torque MR is taken into account as an interference variable u in the Kalman filter:

$$u = [M_R]$$

The interference filter u is applied to the state variables by means of a transformation matrix B:

$$B = \begin{bmatrix} 1/j \\ 0 \end{bmatrix}$$

The output variables of the Kalman filter are the steering angle speed $\dot{\varphi}s$ and the steering torque MS:

$$y = \begin{bmatrix} \dot{\varphi}_S \\ M_S \end{bmatrix}$$

The measuring matrix H is:

$$H = \begin{bmatrix} 1 & 0 \\ 0 & 1 \end{bmatrix}$$

The frictional torque MR is connected to the output via the transmission matrix D:

$$D = \begin{bmatrix} 0 \\ 1 \end{bmatrix}$$

The output of the Kalman filter is an estimated driver's manual torque MH.

The Kalman filter is a loop in which at the start a system state is estimated, and the estimated system state is subsequently corrected with a measurement. During the next pass through the loop, the accuracy of the estimation is compared with the measurement. For this reason, the Kalman filter can be divided into two calculation operations.

Firstly, the estimates of the system state and of an error covariance matrix are mapped onto a current time operation by a projection:

Time Update ("prediction"):
(1) Projection of the previous operation: $\hat{x}_k = A\hat{x}_{k-1} + Bu_{k-1}$
(2) Error covariance of the previous operation: $P_k = AP_{k-1}A^T + Q$ The variables for the first system state and the error covariance matrix must be defined in the first pass of the Kalman filter. The system noise of the Kalman filter is mapped by the variance Q and respectively adapted to the behavior.

During the correction of the measurement, the so-called Kalman gain Kk is firstly calculated. This is calculated using the previously calculated error covariance matrix Pk, the measuring matrix H and the variance R of the measuring noise. The measuring matrix H maps the system state x to the time k onto the measured values zk. The measuring vector and the system state are disrupted by noise. This measuring noise is modelled using the variance R. If the Kalman gain Kk is chosen such that the error covariance matrix PK is minimal, the difference between the real measured value and the estimated measured value is minimal.

Measured Variables Update ("correction"):
(1) Calculation of Kalman gain: $K_k = P_k H^T (HP_k H^T + R)^{-1}$
(2) Update of the estimate with the $\hat{x}_{k,corrected} = \hat{x}_k + K_k(z_k - H\hat{x}_k)$ measured value $z_k$:
(3) Update of the error covariance: $P_{k,corrected} = (I - K_k H) P_k$ In at least one disclosed embodiment there is provision that during the estimation of the frictional torque it is postulated as an approximation that the frictional torque is proportional to the sensed steering torque. This constitutes a simple model for approximating the frictional torque. If MS is the sensed steering torque, the frictional torque MR is obtained with a proportionality factor μ as follows:

$$M_R = \mu * M_S.$$

In addition, in a further disclosed embodiment there is provision that during the estimation of the frictional torque it is postulated as an approximation that the frictional torque is composed, while taking into account the sensed steering torque, of a portion of viscous friction and of a portion of Coulomb friction. The frictional torque can therefore be estimated, for example, as follows:

$$M_R = -\gamma_v * M_S - \text{sign}(M_S) * \gamma_c * (1 - e^{v*|M_S|})$$

where $M_R$ is the frictional torque, $M_S$ is the sensed steering torque, $\gamma_v$ is a coefficient of the viscous friction, $\gamma_c$ is a coefficient of the Coulomb friction and v is a further coefficient. In this disclosed embodiment, the frictional torque can be estimated with much more accuracy from the steering torque.

In this disclosed embodiment, there is provision that before the estimation of the frictional torque a series of measurements is carried out, wherein a further driver's manual torque is sensed directly by means of a further steering torque sensor immediately at the steering wheel, and wherein a proportionality factor between the steering torque which is sensed at the steering torque sensor and the frictional torque is estimated from the further directly sensed driver's manual torque by comparison with the estimated driver's manual torque, or coefficients for a viscous friction, Coulomb friction and further coefficients are estimated. There is provision here that the further steering torque sensor is installed in a vehicle only during the series of measurements, for example, within the scope of a test run with a steering system of the model range of the. After such a test run, both acquired measurement data for the further driver's manual torque sensed directly at the steering wheel and values for the estimated driver's manual torque are then available. If it is assumed that the further driver's manual torque sensed directly at the steering wheel corresponds to a true driver's manual torque, either the proportionality factor μ or the coefficient γv for the portion of the viscous friction, the coefficient γc for the portion of the Coulomb friction and the further coefficient v can be determined therefrom for the respectively used approximation of the frictional torque. If the proportionality factor or the coefficients are correspondingly determined, they are correspondingly used for steering the series during the estimation of the frictional torque and during the execution of the method.

In at least one disclosed embodiment there is provision here that the proportionality factor or the coefficients are estimated by means of a non-gradient-based optimization method. No gradients are required and in this way a global optimum can be found more easily.

In a further disclosed embodiment there is provision that the steering angle speed is sensed by means of a rotor position sensor at an electric power steering (EPS) motor, wherein a transmission ratio which is present is taken into account. Already existing apparatuses of the vehicle can be used, which allows a saving in terms of costs and expenditure.

In at least one disclosed embodiment there is provision that a driver's activity information item is derived from the estimated driver's manual torque, wherein the driver's activity information item comprises information as to whether the driver of the vehicle touches the steering wheel ("hands on") or does not touch it ("hands off"). For this purpose, for example, the estimated driver's manual torque is continuously compared with a threshold value. If the threshold value is exceeded, it is therefore derived as a driver's activity information item that the driver touches the steering wheel ("hands on"). If the threshold value is, on the other hand, not exceeded, it is therefore derived as a driver's activity information item that the driver does not touch the steering wheel or at least does not apply a torque to it ("hands off").

FIG. 1 shows a schematic illustration of a steering system 51. The steering system 51 comprises a steering column 52 which is mechanically connected to a steering wheel 53 and via a steering pinion 54 to a steering rack 55, and can influence a steering angle of the front wheels by rotation. At the lower end of the steering column 52, a steering torque sensor 56 for sensing a steering torque and a steering angle sensor 58 for sensing a steering angle are also formed. To provide assistance, an electric motor 57 can engage on the steering rack 55 (electric power steering—EPS).

Various torques can occur at the steering system 51: a driver's manual torque MH which is applied by the driver can act on the steering wheel 53. A steering torque MS, which is sensed by the steering torque sensor 56 and is made available as a measuring signal, acts on the steering column 52. In addition, the steering system 51 is, as a mechanical system, subject to friction, with the result that a frictional torque MR must be taken into account.

Figure 2:
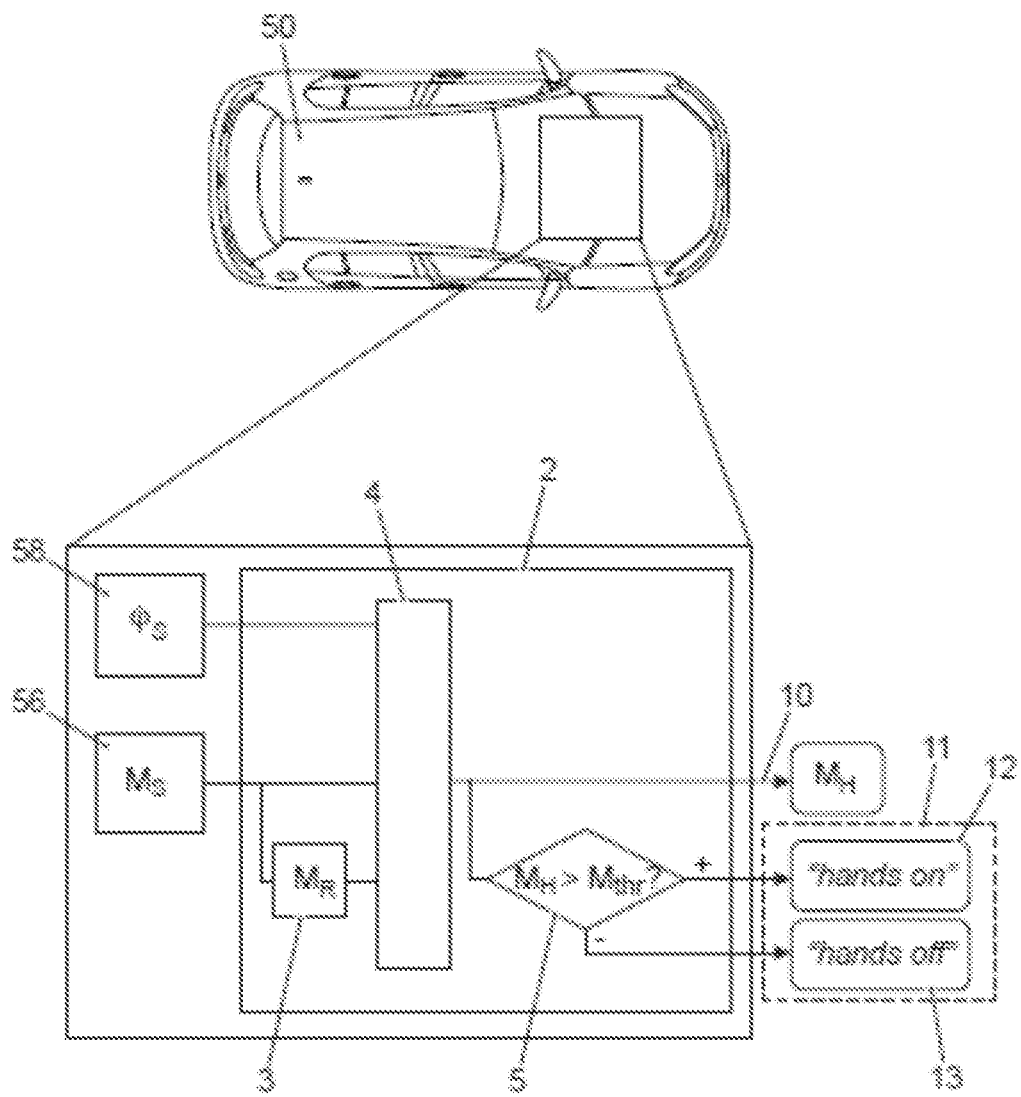
FIG. 2 shows a schematic illustration of an embodiment of a device for determining a driver's manual torque at a steering wheel of a vehicle.

FIG. 2 shows a schematic illustration of an embodiment of a device 1 for determining a driver's manual torque MH at a steering wheel of a vehicle 50. The device 1 comprises a steering angle sensor 58 for sensing a steering angle or a steering angle speed and a steering torque sensor 56 for sensing a steering torque MS. In addition, the device 1 comprises a controller 2. The controller 2 has a frictional torque estimator 3 for estimating a frictional torque MR from the steering torque MS sensed by the steering torque sensor 56, a Kalman filter 4 and a decision device 5.

The steering angle sensor 58 continuously senses a steering angle and derives therefrom a steering angle speed. The steering torque sensor 56 continuously senses a steering torque MS. The frictional torque estimator 4 estimates a frictional torque MR from the sensed steering torque MS. The Kalman filter estimates a driver's manual torque MH from the sensed steering angle speed, the sensed steering torque MS and the estimated frictional torque MR. The estimated driver's manual torque MH is output by the controller 2 as an analog or digital signal 10. In addition, the decision device 5 derives a driver activity information item 11 from the estimated driver's manual torque MH. For this, the decision device 5 checks whether the estimated driver's manual torque MH exceeds a predefined threshold value Mthr or not. If the predefined threshold value Mthr is exceeded, a "hands on" signal 12, which indicates that the driver is touching the steering wheel, is output as a driver's activity information item 11. If the predefined threshold value Mthr is, on the other hand, not exceeded, a "hands off" signal 13 which indicates that the driver is not touching the steering wheel is output as a driver's activity information item 11. Subsequently, the method is repeated cyclically so that a current value is continuously estimated for the driver's manual torque MH.

Figure 3:
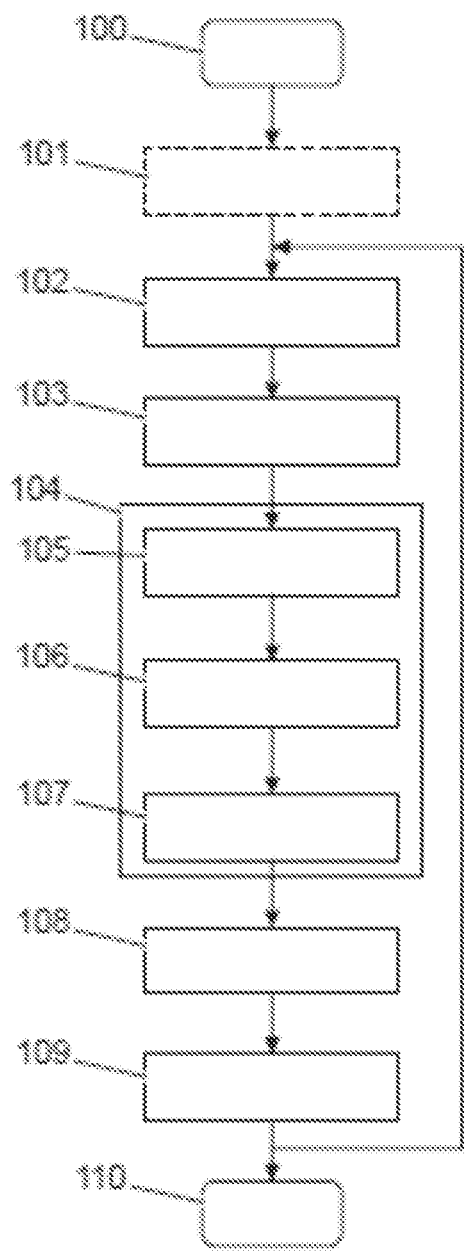
FIG. 3 shows a schematic flowchart of a method for determining a driver's manual torque at a steering wheel of a vehicle.

FIG. 3 shows a schematic flowchart of a method for determining a driver's manual torque at a steering wheel of a vehicle. After the starting 100, in a first method operation at 101, for the time being a series of measurements of the frictional torque estimation is performed. For this purpose, for example, a further driver's manual torque is sensed directly, for example, by means of a further steering torque sensor immediately at the steering wheel. This series of measurements can be carried out here, for example, in a test vehicle. Subsequently, a proportionality factor between the steering torque which is sensed at the steering torque sensor and the frictional torque is estimated from the further directly sensed driver's manual torque by comparison with the driver's manual torque determined in the subsequent method operations at 102-108, or coefficients for a viscous friction, Coulomb friction and further coefficients are estimated. It is possible here to provide that the proportionality factor or the coefficients are estimated by means of a non-gradient-based optimization method. The estimated parameters are then used for future estimations of frictional torque.

In the next method operation at 102, a steering angle speed is sensed by means of a steering angle sensor. A steering torque is subsequently sensed by means of a steering torque sensor in the method operation at 103.

The driver's manual torque is subsequently estimated in the method operation at 104. The method operation at 104 is for this purpose divided into the method operations at 105-107.

In the method operation at 105, a frictional torque MR is calculated on the basis of the sensed steering torque MS. In this context, the parameters determined in the calibration, that is to say the proportionality factor or the three coefficients, are used.

In subsequent method operation at 106, a system state and an error covariance matrix are mapped onto a current time operation by the Kalman filter and therefore the driver's manual torque MH is estimated for the current time operation.

In the method operation at 107, the estimation which is made in the method operation at 106 is corrected by the values acquired in the method operations at 102 and 103. For this purpose, a Kalman gain is calculated. Subsequently, a new system state or a new driver's manual torque MH is estimated. At the end of the method operation at 107, the error covariance matrix of the Kalman filter is updated.

In the subsequent method operation at 108, the driver's manual torque MH which is estimated by means of the Kalman filter is output as a signal, with the result that it can be further processed, for example, by an assistance system of the vehicle.

In addition, in a method operation at 109 there can be provision that from the estimated driver's manual torque MH a driver's activity information item is derived which indicates whether a driver touches the steering wheel ("hands on") or does not touch it ("hands off"). The driver's activity information item is also made available as a signal, so that it can be further processed, for example, by the assistance system of the vehicle.

The method operations at 102 to 109 are repeated cyclically (e.g., with a frequency of 50 Hz), so that an estimated driver's manual torque MH is continuously made available for a current point in time.

If no further estimation of the driver's manual torque MH is to be made anymore, the method is therefore terminated 110.

LIST OF REFERENCE SYMBOLS

1 Device
2 Controller
3 Frictional torque estimator
4 Kalman filter
5 Decision device
10 Signal
11 Driver's activity information item
12 "hands on" signal
13 "hands off" signal
51 Steering system
52 Steering column
53 Steering wheel
54 Steering pinion
55 Steering rack
56 Steering torque sensor
57 Electric motor
58 Steering angle sensor
59 Rotor position sensor
100-110 Method operations
$M_S$ Steering torque
$M_R$ Frictional torque
$M_H$ Driver's manual torque
$M_{thr}$ Threshold value

The invention claimed is:

1. A method for determining a driver's manual torque at a steering wheel of a transportation vehicle, the method comprising:
   sensing a steering angle speed by a steering angle sensor;
   sensing a steering torque at a lower end of a steering column by a steering torque sensor at the steering column which is connected to the steering wheel;
   estimating the driver's manual torque applied by a driver at the steering wheel, by a Kalman filter via a controller, based on the sensed steering angle speed and the sensed steering torque, wherein the estimated driver's manual torque is provided as an output of the Kalman filter, and takes into account a frictional torque as an interference factor during the estimation of the driver's manual torque in the Kalman filter, the frictional torque estimated based on the sensed steering torque;
   sensing a further driver's manual torque by a further steering torque sensor immediately at the steering wheel; and
   estimating a proportionality factor or coefficients by comparison between the estimated driver's manual torque and the sensed further driver's manual torque, and adjusting the estimation of the driver's manual torque according to the proportionality factor or the coefficients.

2. The method of claim 1, wherein the estimation of the frictional torque is based on an approximation that the frictional torque is proportional to the sensed steering torque.

3. The method of claim 1, wherein the estimation of the frictional torque is based on an approximation that the frictional torque is composed of a portion of viscous friction and of a portion of Coulomb friction, while taking into account the sensed steering torque.

4. The method of claim 1, wherein the proportionality factor or the coefficients are estimated by a non-gradient-based optimization method.

5. The method of claim 1, wherein sensing the steering angle speed includes sensing the steering angle speed by a rotor position sensor on an electric power steering motor, wherein a transmission ratio which is present is taken into account.

6. The method of claim 1, wherein a driver's activity information item is derived from the estimated driver's manual torque, wherein the driver's activity information item comprises information as to whether the driver of the transportation vehicle touches the steering wheel ("hands on") or does not touch the steering wheel ("hands off").

7. A device for determining a driver's manual torque at a steering wheel of a transportation vehicle, the device comprising:
   a steering angle sensor for sensing a steering angle speed;
   a steering torque sensor for sensing a steering torque at a lower end of a steering column which is connected to the steering wheel;

a further steering torque sensor immediately at the steering wheel for sensing a further driver's manual torque at the steering wheel; and a controller, wherein the controller estimates the driver's manual torque applied by a driver at the steering wheel, by a Kalman filter, based on the sensed steering angle speed and the steering torque sensed by the steering torque sensor, wherein the estimated driver's manual torque is provided as an output of the Kalman filter, wherein the controller takes into account, during the estimation of the driver's manual torque, a frictional torque and estimates the frictional torque based on the steering torque which is sensed by the steering torque sensor, wherein the controller takes into account the estimated frictional torque as an interference factor during the estimation of the driver's manual torque in the Kalman filter, and wherein the controller determines a proportionality factor or coefficients by comparison between the estimated driver's manual torque and the sensed further driver's manual torque, and adjusts the estimation of the driver's manual torque according to the proportionality factor or the coefficients.

8. The device of claim 7, wherein the steering angle sensor includes a rotor position sensor on an electric power steering motor, wherein a transmission ratio which is present is taken into account during the sensing of the steering angle speed.

9. The device of claim 7, wherein the controller derives a driver's activity information item from the estimated driver's manual torque, wherein the driver's activity information item comprises information as to whether the driver hands touch the steering wheel or do not touch the steering wheel.

10. The device of claim 7, wherein the estimation of the frictional torque is based on an approximation that the frictional torque is proportional to the sensed steering torque.

11. The device of claim 7, wherein the estimation of the frictional torque is based on an approximation that the frictional torque is composed of a portion of viscous friction and of a portion of Coulomb friction, while taking into account the sensed steering torque.

12. The device of claim 7, wherein the proportionality factor or the coefficients are estimated by a non-gradient-based optimization method.

* * * * *